(12) United States Patent
Wier

(10) Patent No.: US 6,302,023 B1
(45) Date of Patent: Oct. 16, 2001

(54) DETONATOR FOR A PYROTECHNICAL GAS GENERATOR AND GAS GENERATOR

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/424,885

(22) PCT Filed: May 27, 1998

(86) PCT No.: PCT/EP98/03124

§ 371 Date: Nov. 29, 1999

§ 102(e) Date: Nov. 29, 1999

(87) PCT Pub. No.: WO98/54536

PCT Pub. Date: Dec. 3, 1998

(30) Foreign Application Priority Data

May 28, 1997 (DE) .............................................. 297 09 390

(51) Int. Cl.[7] ...................................................... F42B 3/18
(52) U.S. Cl. ................. 102/202.2; 102/741; 102/202.5; 102/202.9; 102/530
(58) Field of Search .............................. 102/202.1, 202.2, 102/202.5, 202.7, 202.9, 530, 531; 280/741

(56) References Cited

U.S. PATENT DOCUMENTS

| | | |
|---|---|---|
| 3,882,323 * | 5/1975 | Smolker ............................ 102/202.5 |
| 4,256,038 | 3/1981 | Dietz et al. . |
| 4,273,051 * | 6/1981 | Stratton ............................. 102/202.2 |
| 4,441,427 * | 4/1984 | Barrett .............................. 102/202.6 |
| 4,712,477 * | 12/1987 | Aikou et al. ....................... 102/202.5 |
| 4,819,560 * | 4/1989 | Patz et al. ......................... 102/202.5 |
| 4,869,170 * | 9/1989 | Dahmberg et al. ............... 102/202.5 |
| 5,140,906 | 8/1992 | Little, II ........................... 102/202.14 |
| 5,153,368 | 10/1992 | Fogle, Jr. .......................... 102/202.2 |
| 5,367,956 | 11/1994 | Fogle, Jr. .......................... 102/202.2 |
| 5,634,660 * | 6/1997 | Fink et al. ........................ 102/202.2 |
| 5,955,699 * | 9/1999 | Perotto et al. .................... 102/202.5 |

FOREIGN PATENT DOCUMENTS 2198816   6/1988   (GB) .

* cited by examiner

*Primary Examiner*—Harold J. Tudor
(74) *Attorney, Agent, or Firm*—Tarolli, Sundheim, Covell, Tummino & Szabo L.L.P.

(57) ABSTRACT

The invention relates to a detonator for a pyrotechnical gas generator (3), comprising a squib (9) arranged therein, contact lines (13) for said squib and a high-frequency choke to prevent spurious release, characterized in that the contact lines (13) are extrusion-coated with an electrically non-conducting material (17) or are encapsulated in said material to form a base body, and in that at least one ferromagnetic body (21, 23) and the base body are assembled to form a unit which acts as a high-frequency choke.

26 Claims, 9 Drawing Sheets

DETONATOR FOR A PYROTECHNICAL GAS GENERATOR AND GAS GENERATOR

Figure 1:
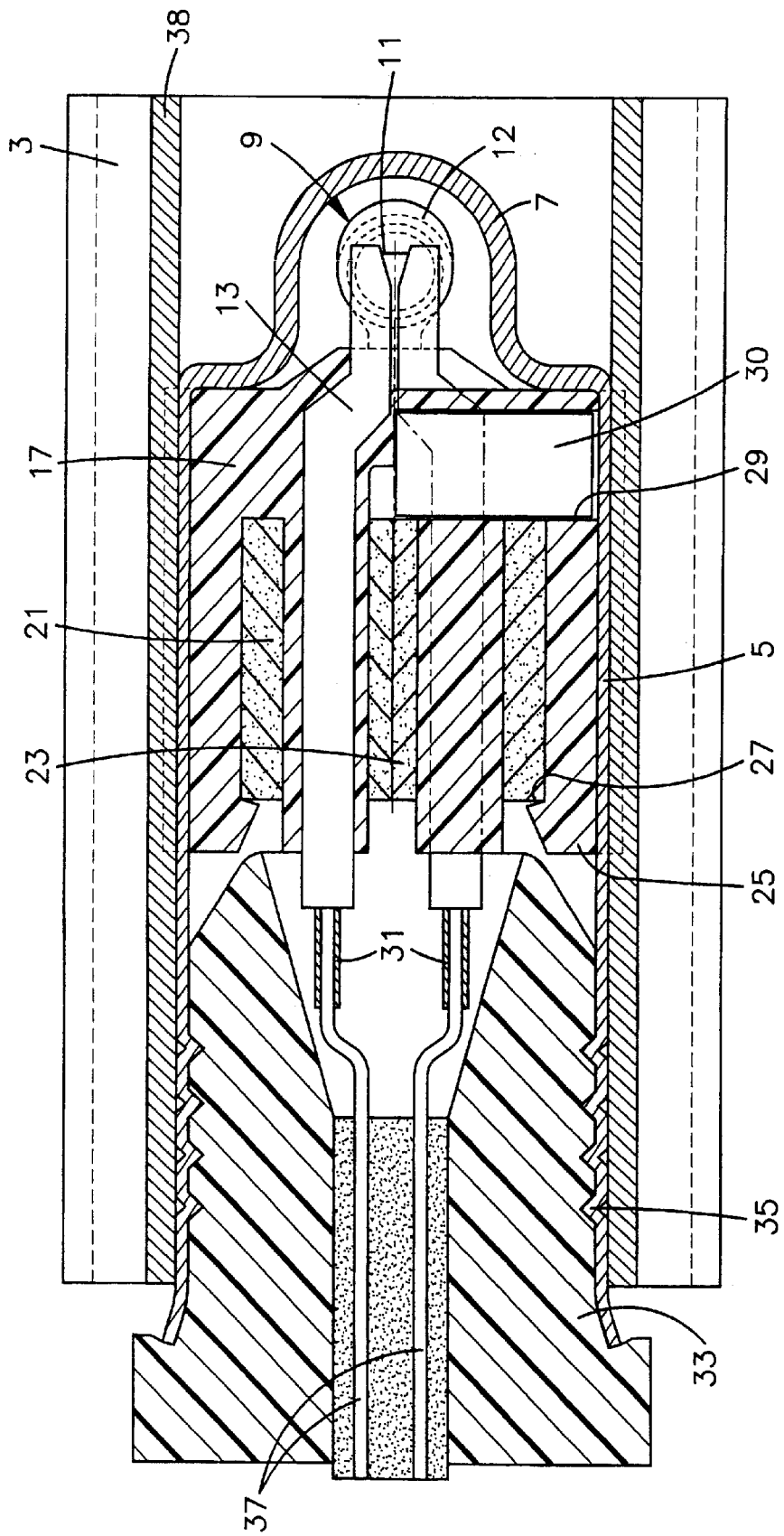

The invention relates to an igniter for a pyrotechnical inflator, comprising a squib arranged therein, contact leads to the squib, and a high-frequency choke for preventing spurious release, the high-frequency choke being formed by at least one ferromagnetic body surrounding at least one contact lead.

Igniters for pyrotechnical inflators of vehicle occupant restraint systems are relatively expensive to manufacture. Manufacturing is done in numerous individual steps and hitherto, due to the complexity of the various components, this also necessitates production by different manufacturers each having the know-how for the individual components concerned. Since, however, the individual components are secured to and based on each other, the parts need hitherto to be shipped from one manufacturer to another for further processing, which is complicated.

The generic document GB 2 198 816 A describes the structure of an igniter comprising a high-frequency filter for inflators, in which small tubes of a ferrite material and small tubes of a dielectric ceramic material are pushed over the contact leads and over each other. While the soldering of the ferrite sleeves is avoided in this way, this structure is still very complicated.

In order to simplify the production of gas-tight high-frequency filters, U.S. Pat. No. 5,367,956 proposes that the leads be surrounded by an electromagnetically absorbent sintered glass ceramics. The entire arrangement including the housing, wires and ceramic mass however needs to be heated to a temperature of 600° C., which would raise the number of manufacturing steps again if this method is used for igniters of a pyrotechnical material.

The invention provides an igniter which is configured substantially simpler than those known hitherto and which necessitates fewer steps in fabrication than hitherto so that the overall expense of fabrication is less. This is achieved in an igniter of the aforementioned kind by the contact leads being configured as at least one printed circuit board, preferably with an electrically non-conductive substrate material on which an electrically conducting material is applied, by the contact leads, for constituting a base body, being molded in an electrically non-conductive material or sealed in such a material, and by the ferromagnetic body and the base body being combined to form a unit serving as the high-frequency choke.

In many of the igniters used hitherto, the high-frequency choke is purchased as a complete item needing to be arranged in relation to the contact leads relatively complicatedly, whereas in the case of the igniter in accordance with the invention individual steps in fabrication can be eliminated since first a base body is formed by molding or sealing the contact leads in an electrically non-conductive material, preferably plastic material, and no separate high-frequency choke needs to be assembled, but merely a ferromagnetic body such as for instance a small tube as known from GA 2 198 816 A is combined with the base body such that the resulting unit acts as the high-frequency choke. In this arrangement the contact leads extending through the ferromagnetic body function as a coil winding, with each contact lead extending through the ferromagnetic body/bodies acting as approximately half a coil winding. As a result of this, the ferromagnetic body is no longer required to be fully covered, as hitherto, and assembly of the individual components is simplified. The molded or sealed contact leads have a dual function.

Fabrication of the contact leads can be simplified further by these being configured completely as at least one printed circuit board. The printed circuit board is made of an electrically non-conductive material which is termed the substrate material. The electrically conductive material is then applied on the substrate material by using a known method, for instance by rolling or printing.

The invention is not restricted to merely an igniter, it also relates to an inflator with the igniter in accordance with the invention integrated therein, the squib being surrounded by a propellant charge. The igniter in accordance with the invention also permits facilitated, cheaper production of a unit comprising inflator and igniter.

Advantageous embodiments of the invention constitute the subject matters of the sub-claims.

Joining the base body and the ferromagnetic body to a single unit is done preferably by bonding, by means of an interlocking fit or with a force-transmitting connection.

The base body comprises preferably a recess adapted to the geometry of the ferromagnetic body into which the latter can be inserted and arrested. The arresting can be realized for example by means of a latching or clip connection formed on the base body, holding the ferromagnetic body in its fitted position. A latching or clip connection has furthermore the advantage that the body is held in place under pretension, so as to avoid rattling.

In the preferred embodiment the ferromagnetic body is inserted into the base body from an end of the base body opposite the squib. The ferromagnetic body is thus inserted axially into the recess preferably formed as a cavity in the base body.

The ferromagnetic body may surround at least one contact lead annularly, or a separate ferromagnetic body may also be provided for each contact lead.

To achieve an adequate inductance the longitudinal extent of the ferromagnetic body corresponds to at least its transverse extent.

In addition, a circuit board may be secured to the base body, this circuit board being connected to the contact leads and featuring at least one contact lead of its own, via which the circuit board communicates with a control unit in the vehicle, thus making it possible to continually monitor the operativeness of the igniter. Due to the circuit board being in the vicinity of the squib the currents necessary for monitoring the operativeness can be kept very low, as desired.

The circuit board, too, is secured to the base body preferably by a plug or latching connection. Circuit board and contact leads may be formed of separate parts which are not interconnected electrically until the base body and the circuit board are joined together. In addition to this, circuit board and contact leads may also be configured integrally.

Figure 3:
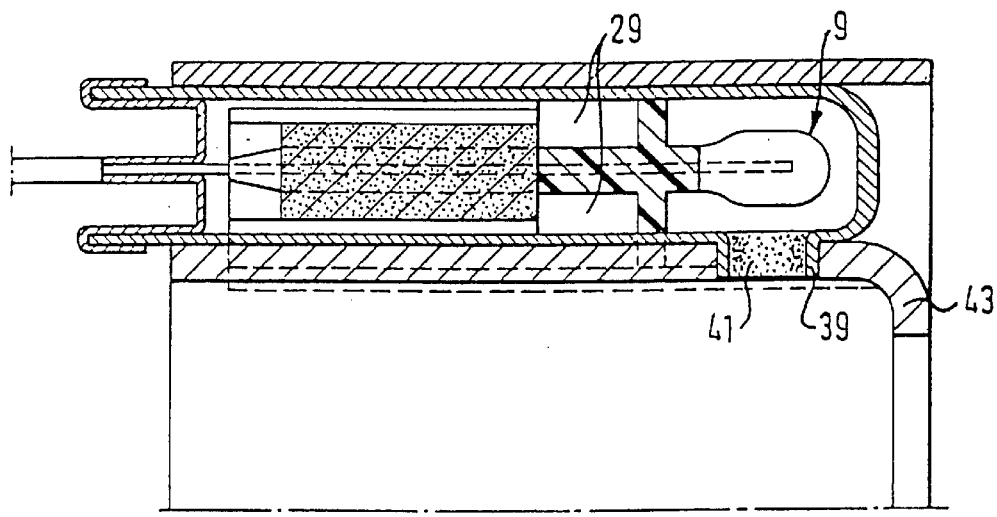
Figure 2:
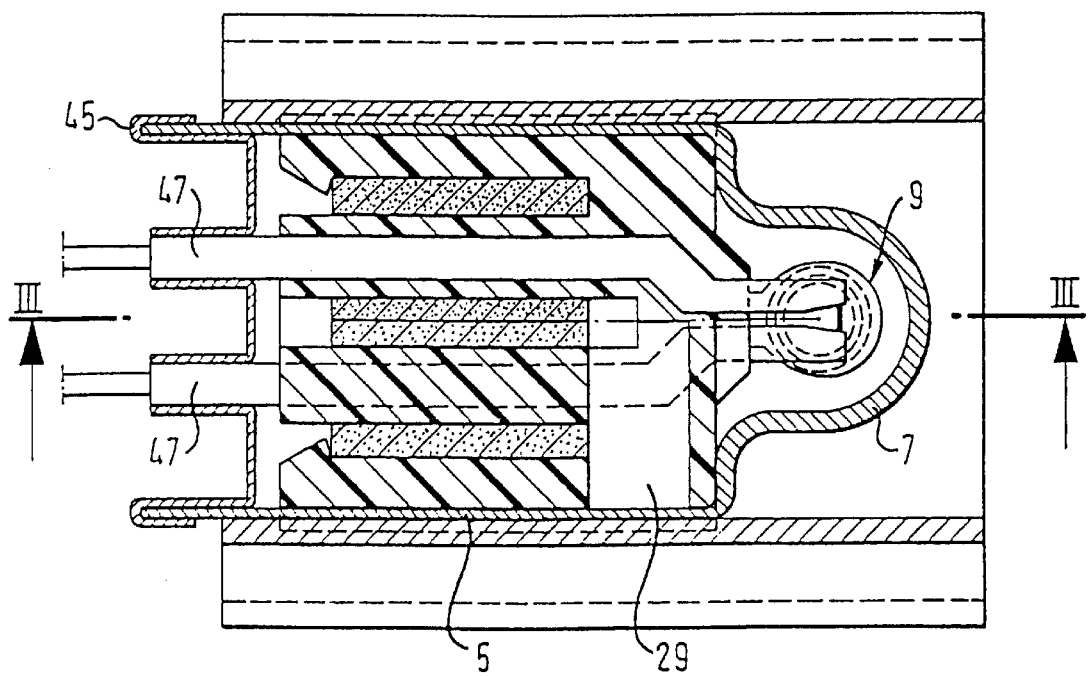
Figure 4:
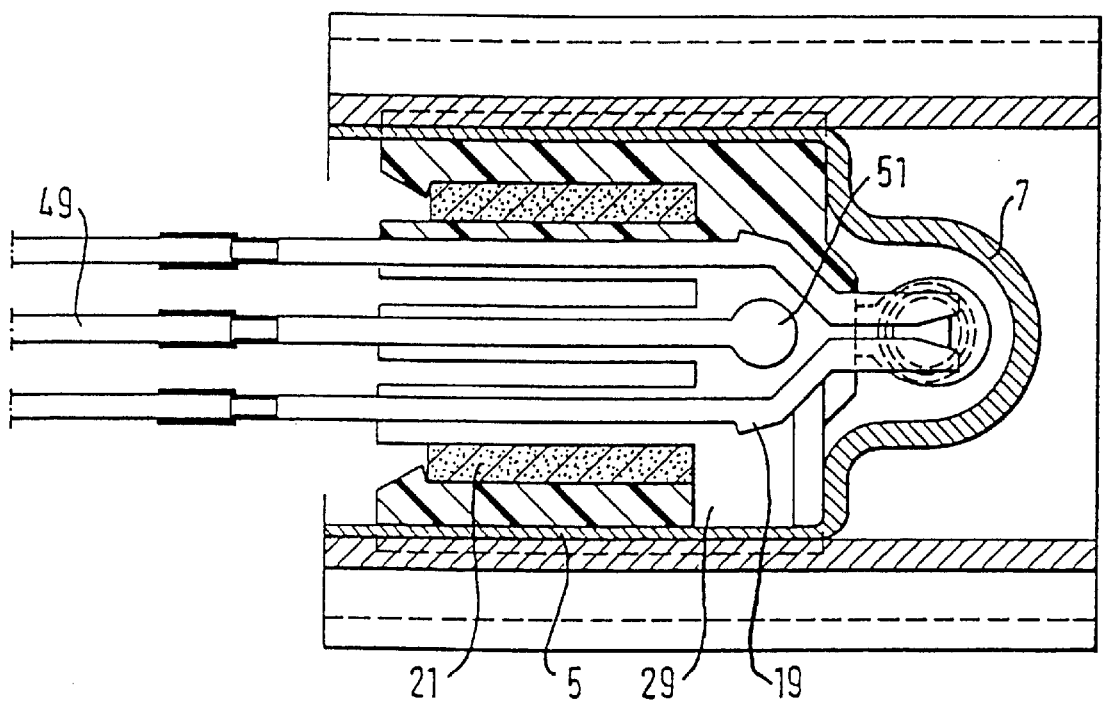
Figure 5:
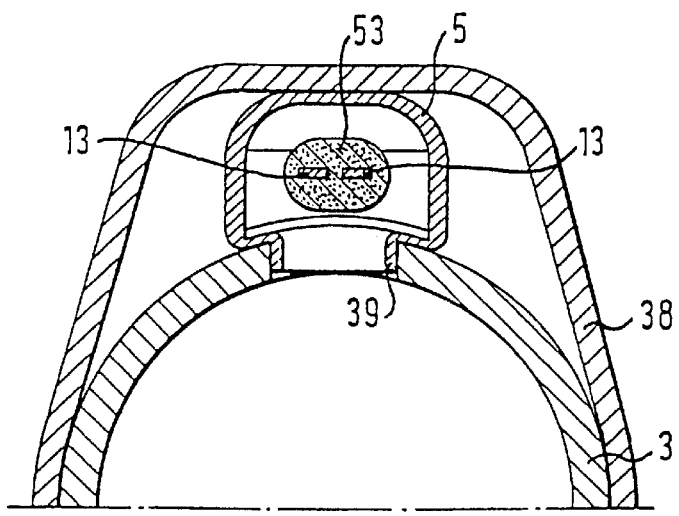
Figure 6:
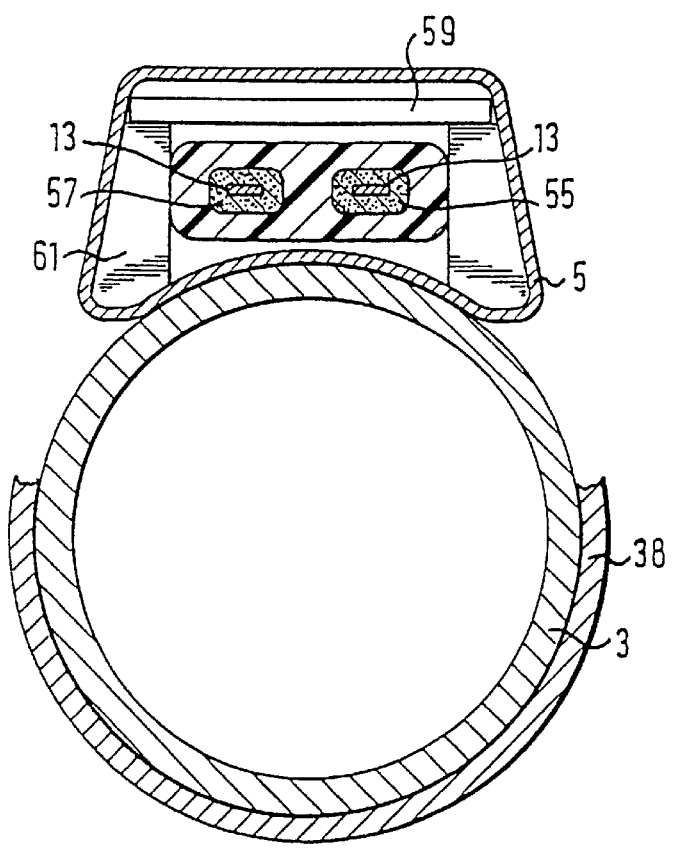
Figure 7:
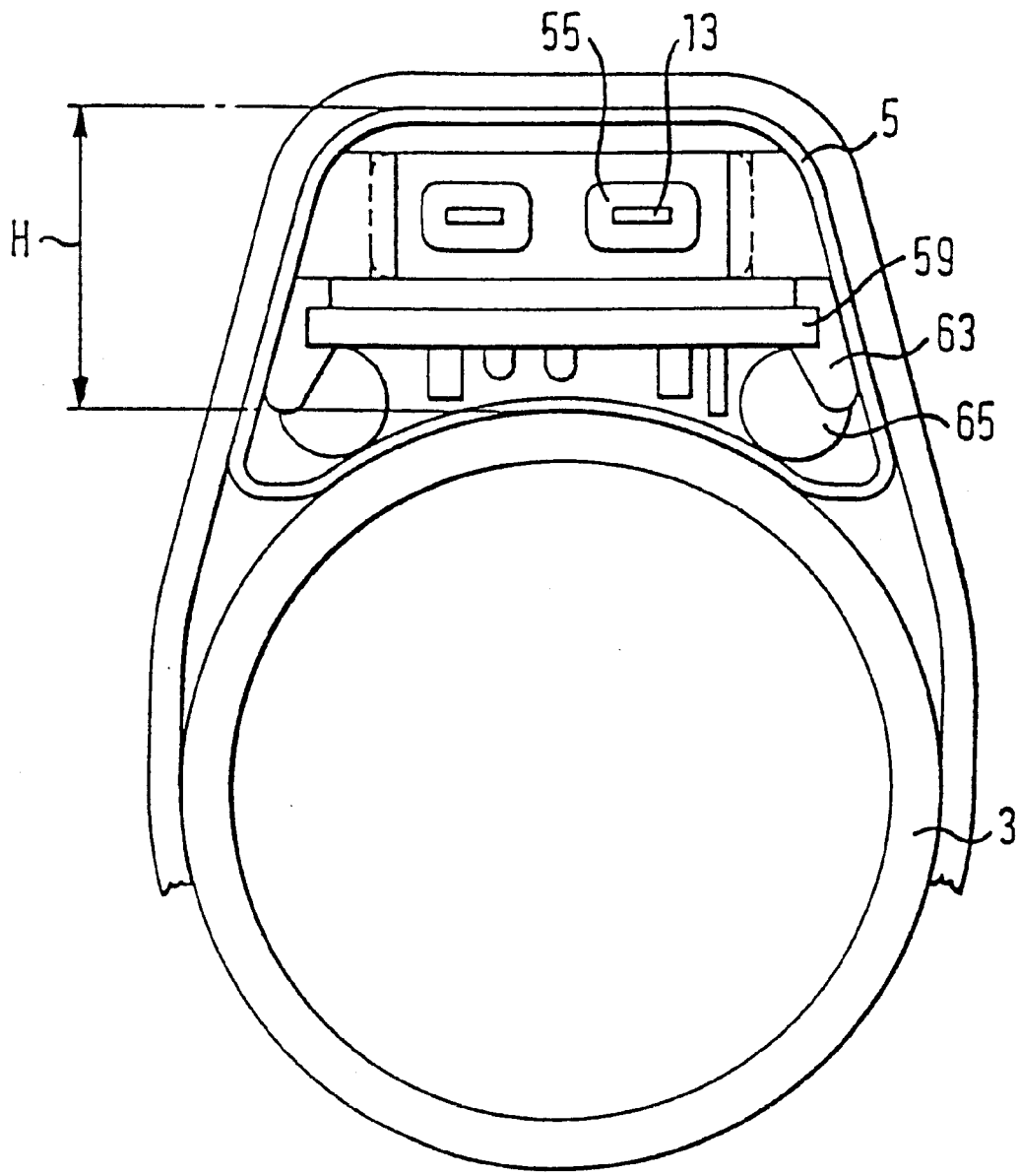
Figure 9:
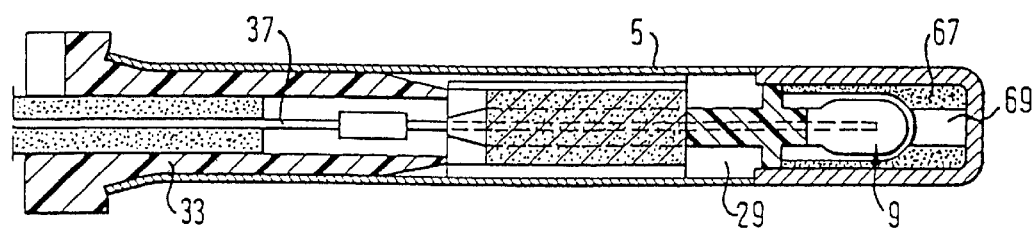
Figure 8:
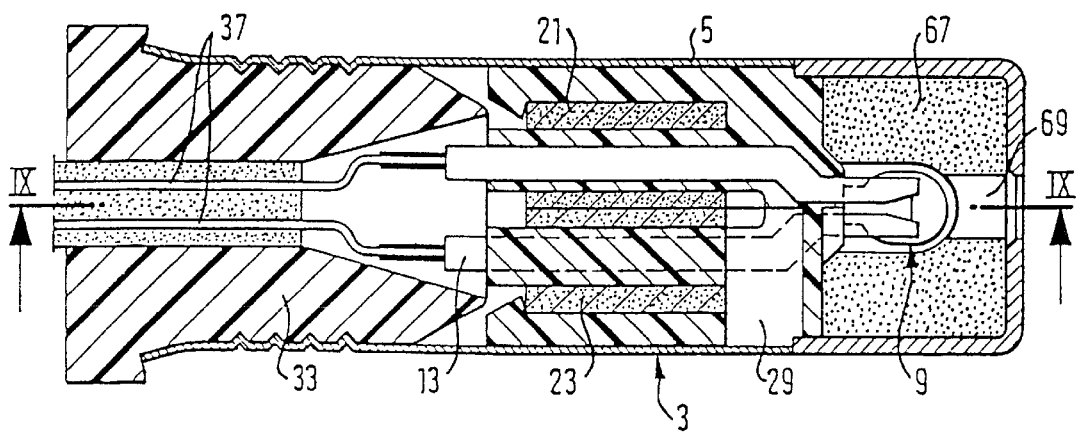
Figure 11:
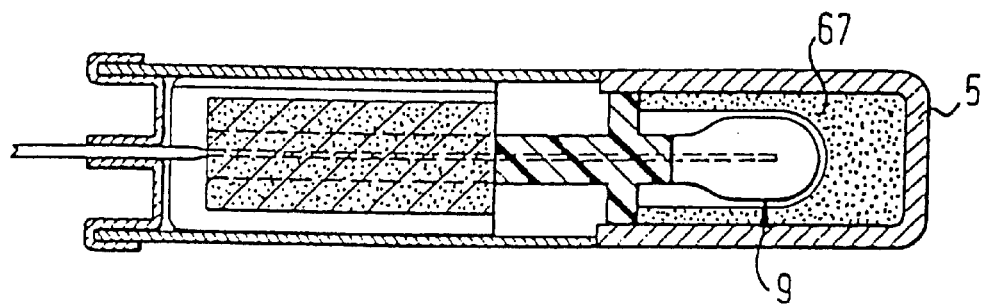
Figure 10:
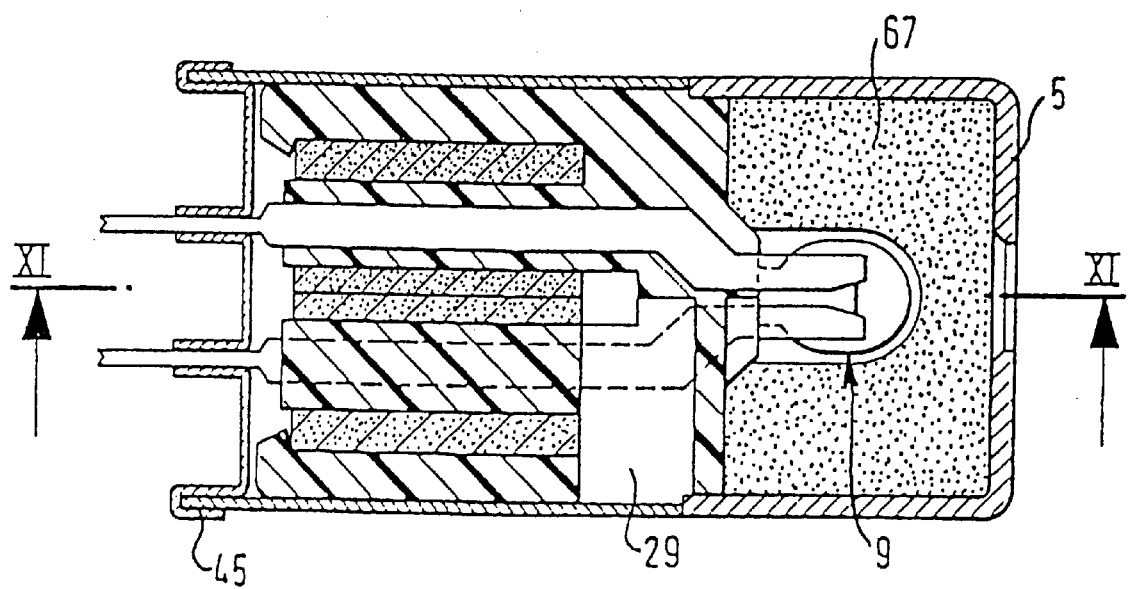
Figure 13:
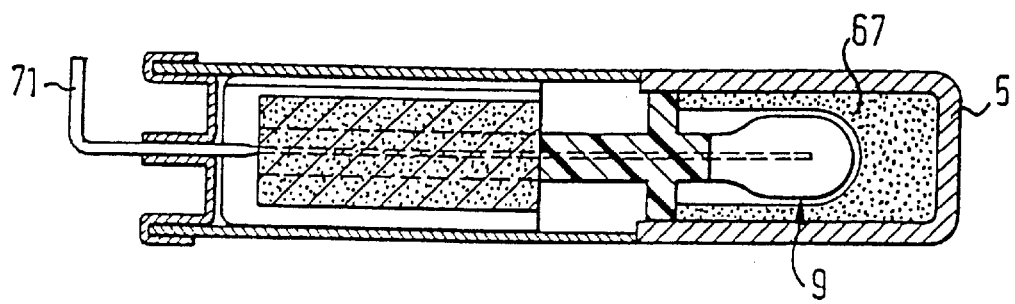
Figure 12:
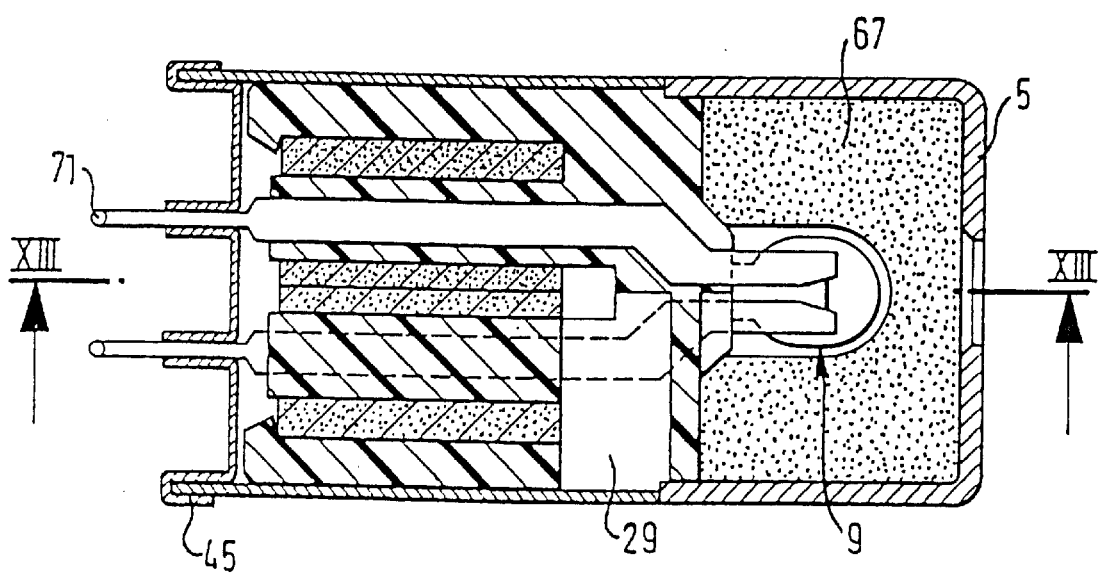
Figure 15:
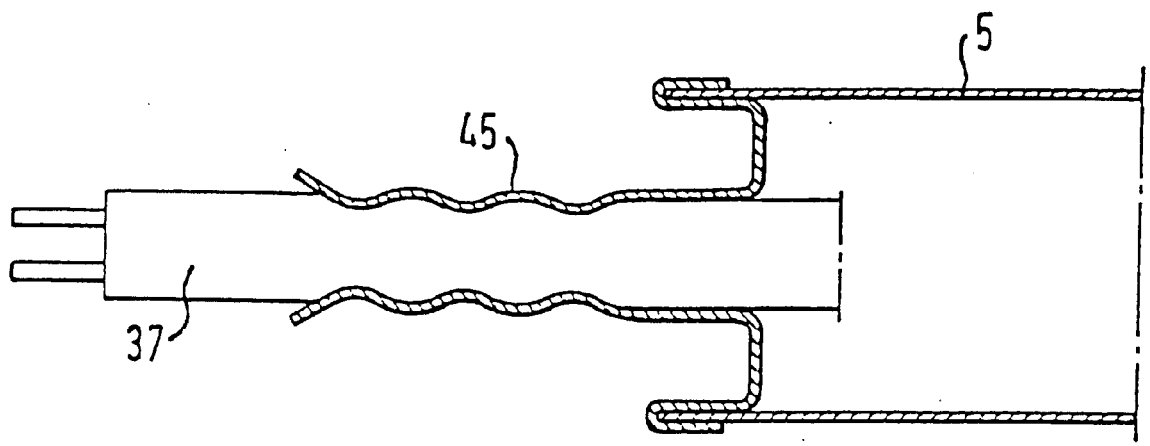
Figure 14:
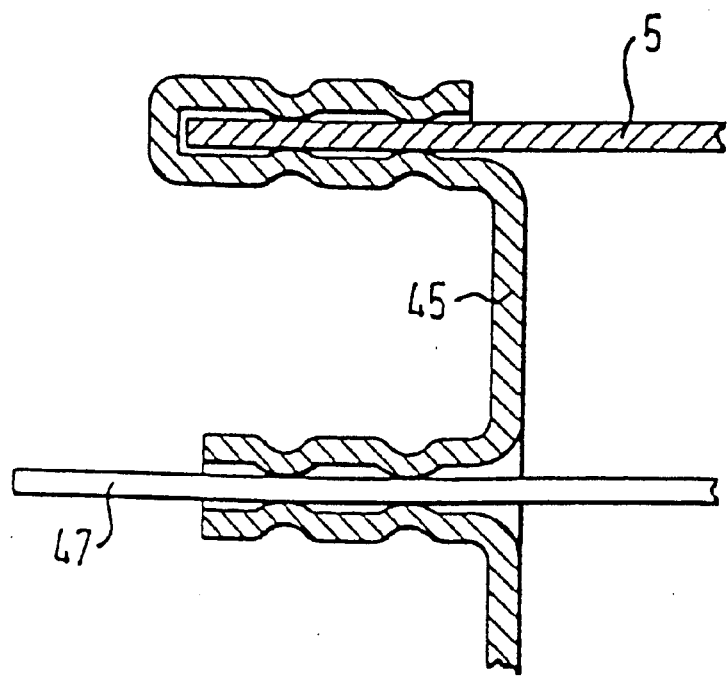

Further features and advantages of the invention will be apparent from the following description with reference to the following drawings, in which:

FIG. 1 is a longitudinal section view through a first embodiment of the igniter in accordance with the invention, FIG. 2 is a longitudinal section view through a second embodiment of the igniter in accordance with the invention, FIG. 3 is a longitudinal section view along the line III—III in FIG. 2, FIG. 4 is a longitudinal section view through a third embodiment of the igniter in accordance with the invention, FIG. 5 is a cross-sectional view through one embodiment of the igniter in accordance with the invention, FIG. 6 is a cross-sectional view through a further embodiment of the igniter in accordance with the invention differing from that as shown in FIG. 5 by the presence of a circuit board, FIG. 7 is a cross-sectional view through an embodiment of the igniter in accordance with the invention differing from that as shown in FIG. 6 by a different arrangement of the circuit board, FIGS. 5 to 7 each showing the igniter in a position secured to an inflator, FIG. 8 is a longitudinal section view through a first embodiment of the inflator in accordance with the invention provided with the igniter in accordance with the invention, FIG. 9 is a longitudinal section view through the inflator in accordance with the invention along the line IX—IX in FIG. 8, FIG. 10 is a longitudinal section view through a second embodiment of the inflator in accordance with the invention provided with the igniter in accordance with the invention, FIG. 11 is a longitudinal section view through the inflator in accordance with the invention along the line XI—XI in FIG. 10, FIG. 12 is a longitudinal section view through a third embodiment of the inflator in accordance with the invention, FIG. 13 is a longitudinal section view along the line XIII—XIII in FIG. 12, and FIGS. 14 and 15 illustrate various means of sealing the igniter at its rear end.

FIG. 1 shows an igniter for a pyrotechnical inflator 3 in a condition as fitted to the inflator 3. The igniter has a housing 5 of light alloy in the form of a tube closed at one end face. At its closed end face the housing 5 comprises a dome-shaped bulge 7. Arranged in the bulge 7 spaced away from the housing is a squib 9 comprising a filament 11 connecting two contact leads spaced away from each other and formed by elongated printed circuit boards. The filament 11 and the contact leads 13 are surrounded in the region of their end assigned to the squib 9 by a pyrotechnical ignitant 12. The contact leads 13 are molded in a plastics material 17 or sealed in a plastic body 17, as a result of which a solid, non-detachable unit of contact leads 13 and the plastic material 17 materializes, which together constitute a base body. Due to molding or sealing, the contact leads 13 are fixed in place so that they are unable to move towards each other or away from each other, making it impossible for the filament 13 to break.

Due to the contact leads 13 not running exactly in a straight line, they instead being bent as in the front region in the vicinity of the squib 9 (cf. FIG. 1) or, as shown in FIG. 4, having protrusions 19 projecting outwards, a positionally secure incorporation of the contact leads in the plastic material 17 results in the axial direction to prevent the contact leads 13 from being pulled out or loosened.

Cavities are provided in the base body in the region of the plastics molding 17, these cavities being open towards the end face of the base body facing away from the squib 9. These cavities extend substantially axially in surrounding the contact leads 13 with a specific spacing filled out with the plastic material. Annular ferromagnetic bodies are inserted into these recesses or cavities from the rear. In the embodiment as shown in FIG. 1 two ferromagnetic bodies 21 and 23 are provided. These are configured as elongated sleeves, each encasing a contact lead 13. Between the two contact leads 13 the ferromagnetic bodies 21 and 23 are in contact with each other. The longitudinal extent of the bodies 21, 23 significantly exceeds their transverse extent. As mentioned, the ferromagnetic bodies are inserted into the base body from the rear, resilient latching noses formed on the base body yielding outwardly on insertion and springing back into place after sliding along the bodies 21, 23 to contact a ramp surface area 27 on the rear side of the bodies 21, 23 under pretension for fixing the latter in position. The design as described permits a simple assembly of the bodies 21, 23 and the base body to form a unit. The ferromagnetic bodies 21, 23 and the contact leads 13 extending therethrough constitute a high-frequency choke. This prevents spurious release of the igniter due to the effect of electromagnetic fields. Each of the contact leads 13 forms a half winding in the at least one coil formed thereby.

The plastics part 17 of the base body comprises furthermore in the vicinity of the squib 9 a chamber 29 being laterally Accessible from without for accommodating a circuit board 30 (schematically shown). In this arrangement the chamber 29 is located such that with the circuit board inserted both contact leads 13 can be contacted by the circuit board. Leading to the chamber 29 is a contact lead (likewise not shown) running parallel to the contact leads 13 and extending within at least one ferromagnetic body 21, 23, the circuit board being connectable via said contact lead to a control unit in the vehicle. The function of this circuit board will be explained in more detail later on.

The contact leads 13 extend on the rear end beyond the plastics molding 17 and are connected via solder joints, plug-in or clamp-type contacts 31 to the ends of cables 37 led out from the housing 5 and leading to the aforementioned control unit.

In order to have the housing 5 closed off gas- and pressure-tight at its open rear end to prevent any gas from exiting through this opening on ignition, a cover in the form of an elastic plug 33 is pressed into the housing 3 and subsequently connected to the housing 5 by means of pressing at the points 35. The cables 37 too, are molded in this plug 33.

The igniter resulting thereby is distinguished by facilitated manufacture due to its simple structure. Assembly can be done in a single production shop only, since the only procedure having any complication is that of producing the squib 9, all other steps in the method involved such as molding around the printed circuit board and producing the high-frequency choke being relatively easy to perform.

The housing 5 like the inflator 3 is surrounded by a clamping ring 38 serving to secure the two parts to each other.

Assembling the basic housing with its bodies 21, 23 inserted therein into the housing 5 configured as a deep-drawn or extruded part is done by inserting it from the open end, a press fit being provided between the outer side of the plastics molding 17 and the inner side of the housing 5. Any contact between the contact leads 13, the housing 5 and the bodies 21, 23 is made impossible by the plastics molding 17.

The embodiment illustrated in FIGS. 2 and 3 differs from that as shown in FIG. 1 by a few details so that the following concentrates on these details.

In the region of the squib 9, the housing 5 comprises a lateral hollow prolongation being communicated with the interior of the housing. In the interior of the prolongation 39 a booster charge 41 is arranged. The prolongation 39 serves to fix the position of the igniter by it extending into an opening in the wall 43 of the inflator. For the purpose of igniting, the wall configured thin in the region of the prolongation 39 is ruptured, the propellant (not shown) being ignited through the resulting opening on burn-up of the booster charge 41.

Instead of the plug 33 as shown in FIG. 1, a cover of an easily deformable metal is secured gas and pressure-tight to the rear end of the housing 5. The cover 45 is configured such that it can be fitted with small play over the contact pins 47 protruding from the plastics molding 17. Subsequently, the edges of the cover 45 in the region of the housing 5 and the contact pins 47 are pressed with the latter, similar to closing a spray can. The end of the contact pins protruding from the cover 45 may serve as a plug contact for being connected with the cables (not shown). As is shown in FIGS. 14 and 15, the cover 45 may engage either the contact pins 47 themselves or a sheathing of the contact pins or cable 37. Furthermore, contact pins 47 and cover 45 may be immersed in a sealing compound either individually or in common. A rubberized surface of the cover or an insertion part may equally serve for sealing. Moreover, it is possible to configure the igniter with a cable lug. Preferred means of securing the cover 45 to the housing 5 in a gas and pressure-tight manner are beading and ultrasonic welding.

The embodiment as shown in FIG. 4 differs from the above in that for the first time a contact lead 49 leading to the chamber 29 is explicitly shown. This lead comprises at its end a contact plate 51 which comes into contact with a circuit board (not shown) when the latter is introduced into the chamber 29.

In the embodiment as shown in FIG. 4, only one ferromagnetic body 21 is provided, it however surrounding all contact leads 13, 49.

Various configurations of one or more ferromagnetic bodies are shown in FIGS. 5 to 7. In FIG. 5 a ferromagnetic body 53 featuring an oval cross-section is shown, this body having two slot-shaped openings through which the contact leads 13 extend. In this configuration a very slim igniter is achieved.

In the embodiment as shown in FIG. 6, two ferromagnetic bodies 55, 57 are provided, each of which surrounds a contact lead 13. However, unlike the embodiment as shown in FIG. 1 the ferromagnetic bodies 55, 57 are not in contact between the contact leads 13. A circuit board 59 extends along the base body in the interior of the housing 5. The separate contact lead for the circuit board 59 is not explicitly illustrated. Via supports 61 protruding from the housing 5 the circuit board 59 is connected to the base body.

In the embodiment as shown in FIG. 7, the circuit board 59 is directly secured to the base body, i.e. to the inner side facing the inflator 3. A plurality of elastic latching noses 63 molded to the base body form a kind of clip connection by means of which the circuit board 59 is locked in place to the base plate.

The connection to the contact leads 13 may be made e.g. via a plug or crimp connection. Since the spacing between the circuit board 59 and the outer contour of the inflator 3 is greatest in the region of the outer longitudinal sides of the circuit board 59, the large components such as e.g. transistors 65 are arranged in this region to thus not negatively affect the overall height H of the igniter due to large components.

Instead of flat contact leads 13, round-section contact leads may also be provided.

The igniter may also be integrated in an inflator without the design as described above needing to be significantly changed. This is illustrated in the FIGS. 6 to 13. In this arrangement, the housing 5 represents not only the housing of the igniter but also that of the inflator. In the region of the squib 9 this housing is no longer surrounded by a dome-shaped bulge 7, since space is provided about the squib 9 for accommodating the propellant charge 67. A booster charge 69 is arranged at the face end of the squib, between the latter and the end wall. The wall of the housing 5 in the region surrounding the squib, i.e. the combustion chamber, is thicker. Since apart from that no modifications are needed as regards the sealing arrangement and making contact between the contact leads and the cable 37 as compared to the embodiments already described, a more detailed description can be dispensed with. Parts already described above in conjunction with the igniter are identified by reference numerals the same as already introduced.

The embodiment of the inflator as shown in FIGS. 10 and 11 differs from that already described by the absence of a booster charge and a plug 33 for sealing the housing 5, instead of which a cover 45 as already described is provided for sealing.

In the case of the embodiment as shown in FIGS. 12 and 13 the propellant charge 67 is accommodated in a thin-walled plastic container, not shown explicitly, which takes up all of the combustion space between squib 9 and housing 5. The contacts extending from the housing 5 in this embodiment are designed as angled plug contacts 71.

The housing 5 may also be coated with a material or made itself of a material having a certain shielding effect.

What is claim is:

1. An igniter for a pyrotechnical inflator comprising:
   a squib arranged in said igniter,
   contact leads connected to said squib,
   at least one ferromagnetic body surrounding at least one of said contact leads,
   said contact leads being configured as at least one printed circuit board,
   said contact leads being one of molded and sealed in an electrically non-conductive material,
   said contact leads and said electrically non-conductive material forming a base body,
   said ferromagnetic body and said base body forming a unit and serving as a high-frequency choke, said high-frequency choke being configured so as to prevent spurious release of the igniter,
   said base body comprising at least one recess, said recess being adapted to the geometry of said ferromagnetic body and
   said ferromagnetic body being inserted into said recess and arrested in said recess.

2. The igniter as set forth in claim 1, wherein a latching connection is formed on said base body, said latching connection retaining said ferromagnetic body in its fitted position.

3. An igniter as set forth in claim 1, wherein a ferromagnetic body is provided for each contact lead, which surrounds said assigned contact lead.

4. The igniter as set forth in claim 3, wherein said ferromagnetic bodies are in contact between said contact leads.

5. The igniter as set forth in claim 1, wherein the longitudinal extent of said ferromagnetic body corresponds at least to its transverse extent.

6. The igniter as set forth in claim 1, wherein said igniter has a housing, said housing being coated with a material or consisting of a material by means of which the interior of said housing is shielded at least in part from electromagnetic radiation.

7. An igniter for a pyrotechnical inflator comprising:
   a squib arranged in said igniter,
   contact leads connected to said squib,
   at least one ferromagnetic body surrounding at least one of said contact leads,
   said contact leads being configured as at least one printed circuit board,
   said contact leads being one of molded and sealed in an electrically non-conductive material, said contact leads and said electrically non-conductive material forming a base body, said base body comprising an end face facing away from said squib, said ferromagnetic body being inserted into said base body from said end face facing away from said squib and said ferromagnetic body and said base body forming a unit and serving as a high-frequency choke, said high-frequency choke being configured so as to prevent spurious release of the igniter.

8. The igniter as set forth in claim 7, wherein said printed circuit board is formed by an electrically non-conductive substrate material on which an electrically conducting material is applied.

9. The igniter as set forth in claim 7, wherein said ferromagnetic body is secured to said base body by bonding, by means of an interlocking fit or with a force-transmitting connection.

10. The igniter as set forth in claim 7, wherein said ferromagnetic body annularly surrounds at least one contact lead.

11. The igniter as set forth in claim 7, wherein a ferromagnetic body is provided for each contact lead, which surrounds said assigned contact lead.

12. The igniter as set forth in claim 11, wherein said ferromagnetic bodies are in contact between said contact leads.

13. The igniter as set forth in claim 7, wherein the longitudinal extent of said ferromagnetic body corresponds at least to its transverse extent.

14. The igniter as set forth in claim 7, characterized in that said igniter is surrounded by a housing into which said base body including said ferromagnetic body is inserted for assembly.

15. The igniter as set forth in claim 14, wherein said housing has a laterally hollow prolongation provided in the vicinity of said squib, a booster charge being arranged in said prolongation.

16. The igniter as set forth in claim 14, wherein said housing opens in the region of said prolongation on ignition.

17. The igniter as set forth in claim 14, wherein said housing is closed off pressure-tight by a cover at the end oppose said squib.

18. The igniter as set forth in claim 17, wherein said cover is configured as a plug pressed into said housing.

19. The igniter as set forth in claim 17, wherein said cover is of an easily workable material and wherein it is secured to said leads protruding from said base body and/or to said housing.

20. The igniter as set forth in claim 7, wherein said igniter has a housing, said housing being coated with a material or consisting of a material by means of which the interior of said housing is shielded at least in part from electromagnetic radiation.

21. An inflator with an igniter integrated therein, the igniter comprising:

a squib arranged in said igniter, a propellant charge surrounding said squib, contact leads connected to said squib, at least one ferromagnetic body surrounding at least one of said contact leads, said contact leads being configured as at least one printed circuit board, said contact leads being one of molded and sealed in an electrically non-conductive material, said contact leads and said electrically non-conductive material forming a base body, said base body comprising an end facing away from said squib, said ferromagnetic body being inserted into said base body from said end of said base body facing away from said squib, and said ferromagnetic body and said base body forming a unit and serving as a high-frequency choke, said high-frequency choke being configured so as to prevent spurious release of the igniter.

22. The igniter as set forth in claim 21, wherein said inflator and said igniter feature a common housing.

23. An igniter for a pyrotechnical inflator comprising:

a squib arranged in said igniter, contact leads connected to said squib, at least one ferromagnetic body surrounding at least one of said contact leads, said contact leads being configured as at least one printed circuit board, said contact leads being one of molded and sealed in an electrically non-conductitve material, said contact leads comprising at least one lateral protrusion, said lateral protrusion being positioned within said electrically non-conductive material, said electrically non-conductive material counteracting any axial displacement of said contact leads, said contact leads and said electrically non-conductive material forming a base body, and said ferromagnetic body and said base body forming a unit and serving as a high-frequency choke, said high-frequency choke being configured so as to prevent spurious release of the igniter.

24. The igniter as set forth in claim 23, wherein a ferromagnetic body is provided for each contact lead, which surrounds said assigned contact lead.

25. An igniter for a pyrotechnical inflator comprising:

a squib arranged in said inflator, contact leads connected to said squib, at least one ferromagnetic body surrounding at least one of said contact leads, and a circuit board connected to said contact leads, said contact leads being configured as at least one printed circuit board, said contact leads being one of molded and sealed in an electrically non-conductive material, said contact leads and said electrically non-conductive material forming a base body, said ferromagnetic body and said base body forming a unit and serving as a high-frequency choke, said high-frequency choke being configured so as to prevent spurious release of the igniter, said circuit board being secured to said base body and being provided with at least one contact lead of its own, via which it is connected to a control unit and said circuit board being arrested at an outer side of said base body.

26. The igniter as set forth in claim 25, wherein said circuit board is integrally formed with said contact leads.

* * * * *